No. 720,911. PATENTED FEB. 17, 1903.
W. GABRIELSON.
ANIMAL TRAP.
APPLICATION FILED APR. 28, 1902.
NO MODEL.
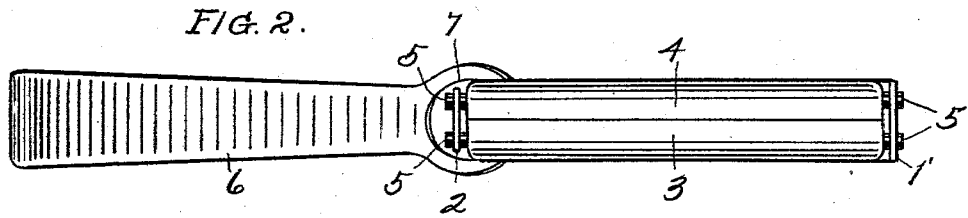
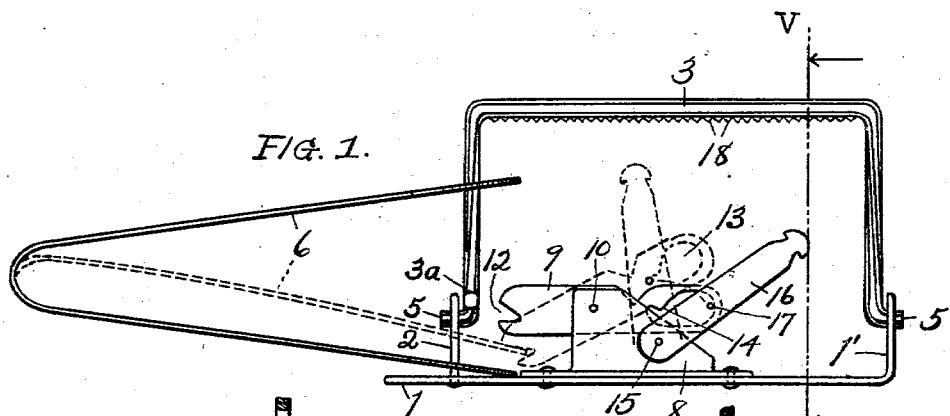
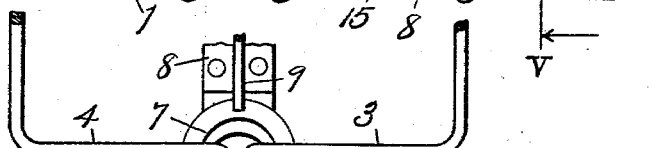
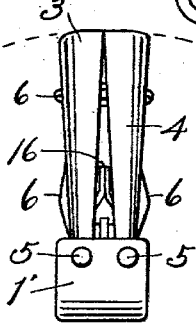
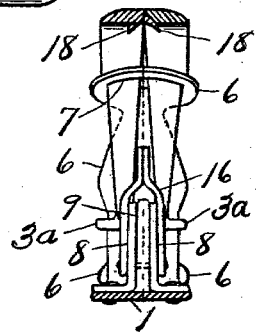
WITNESSES:
J. O. Edson.
M. L. Lange.
INVENTOR
W. Gabrielson,
BY
Higdon & Higdon, ATTORNEYS.

UNITED STATES PATENT OFFICE.

WILLIAM GABRIELSON, OF WALDRON, MISSOURI, ASSIGNOR OF ONE-HALF TO ERICK LARSON, OF KANSAS CITY, MISSOURI.

ANIMAL-TRAP.

SPECIFICATION forming part of Letters Patent No. 720,911, dated February 17, 1903.

Application filed April 28, 1902. Serial No. 105,074. (No model.)

*To all whom it may concern:*

Be it known that I, WILLIAM GABRIELSON, a citizen of the United States, residing at Waldron, in the county of Jackson and State of Missouri, have invented new and useful Improvements in Animal-Traps, of which the following is a specification.

My invention relates to animal-traps; and the object of my invention is to produce a trap which is very easy to set, is simple in construction, and reliable in operation.

I will proceed to fully describe my invention with reference to the accompanying drawings, in which—

Figure 1 is a side elevation of a trap embodying my invention closed and set in dotted lines. Fig. 2 is a top plan view of the trap closed. Fig. 3 is an end elevation of the trap closed. Fig. 4 is a plan view of a part of the trap, the jaws and the frame broken away, the jaws being open or "set." Fig. 5 is a transverse section taken on line V V of Fig. 1.

1 is the frame, it being a single piece of sheet metal bent up at one end 1' and having a piece 2 riveted thereto near one end.

3 and 4 are the jaws, they being U-shaped and having their ends bent outwardly and rounded, as at 5, to form pivots on which the jaws may swing. The pivot ends 5 are mounted in holes in the bent-up end 1' and the riveted piece 2. On each jaw 3 and 4, near one of the pivot ends 5, are integral outwardly transverse sitting-lugs $3^a$, the function of which is described hereinafter.

6 is a U-shaped steel spring, each end of which has a circular opening therein. The jaws 3 and 4 pass through one of said openings 7 when the trap is closed, and the lower end of the spring 6 bears against the frame 1, the piece 2 extending up through the opening therein.

Riveted to the upper face of the frame 1 are two sheet-metal cheeks 8 8, forming a housing for a detent-lever 9, which is mounted pivotally on a pin 10, secured in the cheeks 8. In the end of lever 9 adjacent to the spring 6, is a notch 12, adapted to receive the upper end of said spring when the latter is depressed. In the opposite end of said lever 9 is an irregularly-shaped slot 13, having a projection 14 extending thereto. Pivoted on a transverse pin 15 is the trigger or bait-finger 16, which is bifurcated, as shown in Fig. 5, to straddle the lever 9 and the cheeks or housing 8. A transverse pin 17, secured across the trigger 16, passes through the slot 13 in lever 9.

To set the trap, force down the spring 6 to the position shown in dotted lines. The end of the spring pushes down the transverse sitting-lugs $3^a$ of the jaws 3 and 4 and the notched end of the lever 9, and this movement of this lever raises the trigger 16 to a substantially vertical position, as shown. The pin 17 engaging slot 13 prevents the lever 9 from being turned by the elasticity of the spring 6, while the notch 12 in said lever holds the spring down under tension. The transverse sitting-lugs $3^a$ having been pushed down by the spring 6, as aforesaid, cause the jaws 3 and 4 to separate and drop to horizontal positions at opposite sides of the frame, in which positions they are held by reason of the lugs $3^a$ being held together by the opening 7 in the spring. The bait is placed on the trigger 16. When the bait is disturbed, the motion of the trigger will move pin 17 back in slot 13, thereby permitting the detent-lever—that is, the notched end thereof—to be snapped up by the spring 6, the circular opening 7 in which, sliding up along the transverse arms of the jaws 3 4, snaps the jaws together with great force and quickness, so that the animal is caught between them and further held by the teeth 18 thereon. The teeth 18 on each jaw are directed toward the other jaw, as indicated in Fig. 5, so that when the jaws are together said teeth interlock with one another, as will be readily understood.

Having now fully described my invention, what I claim as new, and desire to secure by Letters Patent of the United States, is—

1. In an animal-trap, a frame, a pair of swinging jaws mounted pivotally thereon, transverse sitting-lugs $3^a$ on said jaws, a spring having an opening in its end, said opening embracing the radial portions of said jaws when the jaws are closed, a detent-lever pivoted on said frame in position to hold said spring depressed, a slot in said lever, a trigger, a pin secured thereto and entering said slot; said slot being of such a form that the movement of said lever when the trap is set will raise the trigger to an upright position, and that said slot will be engaged by said pin in such a manner as to hold said trigger and lever insecurely in set position, substantially as described.

2. In an animal-trap, a frame, a pair of swinging jaws having radial portions mounted pivotally on said frame, transverse sitting-lugs 3ª mounted on said jaws, a U-shaped spring having one end thereof resting on said frame and its other end having an opening therein embracing said radial portions provided with said lugs, when the jaws are closed, a detent-lever pivoted on said frame in position to hold said spring depressed, a slot in said lever, a trigger, a pin secured thereto and entering said slot; said slot being of such a form that the movement of said lever when the trap is set will raise the trigger to an upright position, and that said slot will be engaged by said pin in such a manner as to hold said trigger and lever insecurely in set position, substantially as described.

In testimony whereof I affix my signature in the presence of two witnesses.

WILLIAM GABRIELSON.

Witnesses:
O. M. VAN DORSTON,
M. L. LANGE.